United States Patent [19]

Van Ooyen

[11] Patent Number: 4,959,223
[45] Date of Patent: Sep. 25, 1990

[54] RUMINANT ANIMAL FEEDSTUFFS

[75] Inventor: Johannes A. C. Van Ooyen, Giessenburg, Netherlands

[73] Assignee: BP Chemicals Limited, London, England

[21] Appl. No.: 340,905

[22] Filed: Apr. 20, 1989

[30] Foreign Application Priority Data

Apr. 21, 1988 [GB] United Kingdom ............... 8809455

[51] Int. Cl.$^5$ .............................................. A23K 1/22
[52] U.S. Cl. ......................................... 426/2; 426/69; 426/74; 426/623; 426/630; 426/807
[58] Field of Search ............... 426/69, 74, 635, 335, 426/532, 626, 807, 2, 532; 562/607

[56] References Cited

U.S. PATENT DOCUMENTS

| | | | |
|---|---|---|---|
| 3,008,986 | 11/1961 | Hyson | 426/653 |
| 3,982,026 | 9/1976 | Fahnenstich et al. | 426/61 |
| 4,199,606 | 4/1980 | Bland | 426/532 |
| 4,376,790 | 3/1983 | Ames | 426/69 |
| 4,401,624 | 8/1983 | Atwater | 426/807 |
| 4,824,686 | 4/1989 | Dunn et al. | 426/532 |

OTHER PUBLICATIONS

The Merck Index Eighth Edition Published by Merck & Co. Rahway, N.J. (1968) p. 965.
The Merck Index Eighth Edition 1968 p. 195.

*Primary Examiner*—R. B. Penland
*Attorney, Agent, or Firm*—Brooks Haidt Haffner & Delahunty

[57] ABSTRACT

This invention relates to a supplement to ruminant animal feedstuffs to improve the milk production and milk protein yield of ruminants e.g. cows. The supplement comprises a basic salt of propionic acid having a pH of 8–14.

11 Claims, No Drawings

RUMINANT ANIMAL FEEDSTUFFS

The present invention relates to a feed supplement for ruminant animal feedstuffs, especially the feedstuff for dairy cows.

Ruminant animals differ markedly from non-ruminant animals, such as pigs, in being able to digest cellulose. This ability stems from the fact that ruminant animals have an expanded part in their alimentary tract where the bulky fibrous foods can be delayed in their passage to undergo the extensive fermentation necessary for their utilisation. Ruminants, such as cattle, sheep and goats, are able to extract the maximum nourishment from coarse fibrous foods. Cattle and sheep can digest between 45-50% of the fibre of wheat and oat straw. Ruminants are such efficient users of coarse fibrous material because they are equipped with a stomach containing four compartments. The first and largest of these compartments is the rumen, which accounts for about 80% of the total stomach volume. Rumen digestion is succeeded by peptic and intestinal digestion and this is followed by a further fermentation in the large intestine.

In adult cattle the rumen can occupy a volume of from 100 up to 300 liters. At the end of a meal the rumen frequently contains 68-82 Kgs of material. The rumen never empties and rarely contains as little as half its capacity. Between 70-85% of the digestible dry matter of a ruminant's food is utilised in the rumen. The rumen is non-functional in the new-born animal, but rumen fermentation begins within a few weeks. Diet has an important influence on the onset of rumination. The rumen is essentially a continuous, anaerobic, highly reducing symbiotic fermentation system. The semi-solid contents are at a slightly acid but buffered pH (5.5-6.5) at a temperature of 38°-42° C. under a gas phase of carbon dioxide, methane and nitrogen. The rumen contains a mixed population of bacteria and protozoa. At least 30 different species of protozoa and thousands of strains of defined species of bacteria are involved. The bacteria may number $10^{10}$ and the protozoa $10^6$ per gram of rumen contents. Protozoa are much larger organisms than bacteria and their total bulk may be roughly equivalent to that of the bacteria. Most of the biochemical processes taking place in the rumen are brought about by the bacterial population; the protozoa have an important, but perhaps not essential part to play.

The micro-organisms in the rumen break down carbohydrates to volatile fatty acids and proteins to peptides, amino-acids and ammonia. They synthesize protein for their own structure and also vitamins, particularly those of the B group. The soluble products of the anaerobic fermentation are absorbed through the rumen wall, the insoluble material together with bacterial cells are passed along the digestive tract assisted by very considerable quantities of saliva (50-82 liters/day).

Carbohydrates, such as cellulose, hemicellulose, pectins, starch, sucrose etc are degraded by enzymes produced by the micro-organisms of the rumen by a complex series of reactions into a mixture of volatile fatty acids. The total concentration of volatile fatty acids and the proportions of the individual acids present are dependent on the diet, the rate of absorption through the rumen wall, the rate of passage from the rumen, dilution with saliva, utilisation by rumen micro-organisms and conversion to other metabolites. In the typical example of a cow on free grazing the total volatile fatty acids in the rumen was found to be 14.8 m moles/100 ml and the molecular proportions of the acids were acetic 67.5, propionic 18.2, butyric 11.1, higher acids 3.2. Changing the diet to a normal winter feed of hay and concentrates does not alter these figures very much, but a feed containing large quantities of concentrates and little hay gives a mixture containing the molecular proportions of acetic 40.6, propionic 36.5, butyric 10.7 and higher acids 12.3.

Under normal conditions only traces of volatile fatty acids of chain length greater than five are present. Only traces of formic acid are found in the rumen; it is an intermediate in the metabolism being rapidly converted to methane and carbon dioxide. Formic acid is found in considerable quantities in venous blood and in urine, being synthesised in the liver. Lactic acid is present in the rumen of cattle receiving an average diet only in the immediate post-feeding period. Succinic acid also occurs as an intermediate.

Over the past 20 years it has been shown that acetic, propionic and butyric acids produced from foodstuffs within the rumen together account for 50% or more of the energy absorbed from the ruminant digestive tract and that the mixture of acids produced in the rumen varies with the chemical composition and physical nature of the diet.

In Chemistry & Industry, October 24, 1964, pp 1778-1787, Rook, J. A. F. and Storry, J. E. report a detailed study entitled "Energy Nutrition and Milk Secretion in the Diary Cow". According to this article, in the milking cow, continuous infusion of individual acids into the rumen produces responses in the yield and composition of milk that are characteristic for each acid. Acetic acid gives an increase in the yield of milk and a specific increase in fat content. Propionic and butyric acids are without effect on milk yield but propionic acid decreases the fat content in milk and increases the protein content, whereas butyric acid has the single effect of increasing the fat content. As nutrients, therefore, the volatile fatty acids clearly have different roles and an alteration in the end products of rumen digestion may not only change the overall efficiency of utilisation of dietary energy but also increase one productive process at the expense of another.

Referring to the effect of the addition of volatile fatty acid (VFA) salts to the diet of the milking cows, the article states that:

"Sodium-salts of the acids, in amounts equivalent to not more than 700 g of acid/day have been given to milking cows, either mixed with the concentrate part of the ration or given as a solution, sometimes in admixture with small quantities of acid, directly through a fistula into the rumen. With cows receiving diets low in roughage which had caused a depression in milk fat content, additions of acetate or butyrate usually caused a partial or a complete recovery in fat content, whereas additions of propionate had no effect. This increases in fact content were associated with an increase in the Reichert-Meissl value. With cows on diets providing adequate roughage, additions of acetate and butyrate did not affect the fat content but propionate caused a small decrease. Larger additions of up to 2 kg acid/day, given as a continuous intraruminal infusion of dilute acid, have shown that even with cows on diets providing adequate roughage, an increase in fat content may occur in response to acetate and, more particularly, butyrate. Propionate, on the other hand, gives a marked fall in fat content".

It is further stated in respect of milk fat content that:

"In view of the marked increase in the concentration of propionic acid relative to that of acetic acid in rumen liquor in cows given diets lacking in roughage, it must be concluded that there is a significant increase in the ruminal production of propionic acid . . . . Since maximum depressions of 20-30% in milk fat content were found with additions of up to 2 kg/day of propionic acid to the rumen, it seems unlikely that the whole of the fall in milk fat content observed on low-roughage diets can be accounted for by an increased ruminal production of propionate".

Similarly, in respect of milk protein content, the article states that:

"In comparison with the other foods, the feeding of flaked maize characteristically is associated with an increase, in the rumen contents, of the concentration of propionic acid relative to the concentrations of the other acids. In confirmation of the apparent association between the ruminal production of propionic acid and milk protein synthesis, the intraruminal infusion of propionic acid in milking cows gives a specific increase in milk protein content without change in milk yield. Intraruminal infusions of acetic and butyric acids are without measureable effect on milk protein content".

Finally in respect of milk yield this article states that:

"Studies of the effects of intraruminal infusions of volatile fatty acids have shown that acetic acid gives an increase in milk yield but that propionic and butyric acids are without effect. Consistent with these observations is the comparatively small increase in milk yield that occurs in response to dietary additions of flaked maize, a food that favours the production in the rumen of propionate at the expense of acetate. From these observations it has been concluded that the uptake of acetate from the gut, and not the uptake of glucoganic substances, limits the energy available for synthetic purposes in the udder. In support of these observations, the increases in milk yield that occur in response to intraruminal additions of acetate are associated with an increase in the acetate content of peripheral blood, whereas the considerable decreases and increases in blood glucose concentration associated with intraruminal additions of butyric acid and propionic acid respectively are without effect on milk yield".

Thus the general conclusion that can be drawn from this detailed review is that propionic acid and its salts have no significant effect on milk fat, milk protein or milk yield of dairy cows.

In addition to the above, it is well known that ruminant animals find feeds containing large quantities of propionic acid unpalatable. Moreover, infusion of the acid intraruminally can be carried out only to a limited extent. Also, the beneficial effect, if any of such a Procedure, is very short as a proportion of the lactation period of e.g. a cow.

It has now been found surprisingly that if the propionic acid is used in the form of a specific type of salt, the milk yields are improved significantly thereby representing a substantial advance in the art.

Accordingly, the present invention is a supplement for ruminant animal feedstuffs comprising a salt of propionic acid characterised in that the salt is a basic salt of propionic acid.

By the term "basic salt of propionic acid" is meant here and throughout the specification a salt containing as cations one or more ions selected from ammonium ion, and Group I and Group II metal ions according to the Periodic Table, said salt having a pH value of 8-14.

Basic propionate salts of ammonium, sodium, potassium, calcium and magnesium having a pH value of 8-12 are preferred.

The basic propionate salts are preferably propionates of one or more cations with an excess of hydroxyl ions.

The basic propionate salts can ba added as a supplement to any of the feed rations of the ruminant animal. For instance if the basic salt is added to a feed concentrate, the amount of such salt present in the feed concentrate is suitably from 0.5-50% w/w, preferably from 1.5-15% w/w of the concentrate fed to the ruminant animal. On the other hand if these amounts are based on the total dry matter intake of the animal, the basic salt is suitably present in an amount from 0.1-20% w/w of the total dry matter in the feed.

The dry matter in this context includes, any or all of roughage, silage, fodder, forage, grains etc which constitute the normal feed of such animals.

The method of supplementing the diet of the ruminant animal is suitably by oral administration whether this is in solid form or as a solution. In the case of the soluble basic propionate salts, such may also bs incorporated in the drinking water given to the ruminant.

The basic propionate salts of the present invention are either readily available commercially or can easily be made by those skilled in the art. For instance the basic propionate can be made simply by mixing sodium hydroxide in solution with e.g magnesium oxide and/or calcium oxide and then reacting the mixture with less than a molar equivalent of propionic acid.

The feed supplements of the present invention have significant added advantage. Thus, in addition to providing a significant and unexpected increase in milk production, when used as a feed supplement for dairy cows, these supplements exhibit much less odour and corrosivity to equipment in comparison with the use of the corresponding free acids. Moreover, the ruminant animals find it readily acceptable and more palatable. It is much more conveniently handled by operatives such as farmers and dairymen. Most importantly, the quantity of the supplement that can be added to the diet is not limited as previously.

Representative feed supplements of the present invention were fed to dairy cows in trials over a three month period in order to demonstrate their value in increasing milk and milk protein production. The specific compositions of the feeds and other relevant features are set out in the Examples and Tables below which illustrate the invention.

The feed supplement of the present invention was tested with two sets of feed concentrates and with each set a control test (not according to the invention) was also run where the presently claimed feed supplement was omitted. The feed supplement when used was the basic propionate of a mixture of magnesium/sodium/calcium which contained these metals in concentrations of about 5%/11%/6% by weight respectively and propionic acid in an amount of about 75% by weight. The basic propionate salt having this composition was prepared by mixing together the following components:

|  | wt (Kg) |
|---|---|
| NaOH | 19.1 |
| MgO | 8.4 |

-continued

| | wt (Kg) |
|---|---|
| CaO | 8.4 |
| Propionic acid | 75.0 |
| Water | 300 |

The mixture was reacted with stirring for about 2 hours and the resultant product cooled to about 30° C. and spray-dried. The pH of the basic propionate salt so produced was 9. The salt was added to the ed concentrates shown in the Tables below in an amount of 2% by weight. This corresponds to about 3 mols/day/cow.

The concentrates shown below admixed with the feed supplement were fed to about 220 dairy cows in their early lactation stage over a period of three months. The average milk yield and the milk protein yield of the cows fed with the two sets of feeds are shown below in the Table. The average yield per day rose to the stated levels in the Table within 3-4 days and remained at that level over the test period of 3 months. In contrast, cows fed on the concentrates alone without the feed supplement as a control test yielded a relatively lower amount of milk and milk protein per day over the same period.

These results are tabulated below:

TABLE 1

| Feed Concentrate Samples | | |
|---|---|---|
| | 1 | 2 |
| Ground nut residue | 80 | |
| Dried beet pulp | 50 | 25 |
| Coconut slivers | 100 | |
| Maize & gluten germ meal | 141 | 350 |
| Rapeseed residue | 33 | 48 |
| Lupins | | 50 |
| Citrus pulp | 266 | 284 |
| Palm slivers | 200 | 150 |
| Soya residue (40%) | | |
| Linseed | 50 | 30 |
| Sunflower seed | - | |
| Molasses | 30 | 50 |
| Molasses residue | 20 | 20 |
| Limestone | 2 | 5 |
| Salt | 8 | 8 |
| Fat | | 7 |
| Vitamin Premix No. 11 | 5 | 5 |
| | 1000 Kg | 1000 Kg |
| Vitamin Premix No. 11 Content/Kg | | |
| Vitamin A (Internation Units/Kg) | 5000 | 5000 |
| Vitamin D3 (Internation Units/Kg) | 1000 | 1000 |
| Crude protein | 176 g | 158 g |
| Digestible protein | 135 g | 120 g |
| Crude fat | 62 g | 44 g |
| Crude fiber | 126 g | 108 g |
| Ash | 76 g | 81 g |
| Water | 97 g | 106 g |
| Calcium | 7.6 g | 9 g |
| Phosphorus | 4.5 g | 5 g |
| Sodium | 4 g | 4 g |
| Energy value (mJ/Kg) | 11.1 | 10.7 |

EXAMPLE 3

A feed supplement was prepared as for Examples 1 and 2 above but now containing a basic propionate salt with the following components:

N 3% w/w

Mg 4% w/w

Na 6% w/w

Ca 11% w/w

The pH of the propionate salt was adjusted by using ammonia (represented as N above) to a value of 10.5.

2.5% w/w of this basic salt was present in a feed concentrate of formulation for Example 1 above with marginal increases in the concentrations of calcium and sodium values in the Table 1 above.

This feed was fed to 60 cows at the rate of 240 g/cow/day. A blank run was also made on a separate set of cows but without the supplement. The milk yield from the cows was monitored and the results are also shown in Table 2 below.

TABLE 2

| Feed Concen-trate Used | Whether Feed Supplement Added | Milk Yield | | Milk Protein Yield | |
|---|---|---|---|---|---|
| | | Gross (Kg) | % Increase | Gross (9) | % Increase |
| 1 | Yes | 31.5 | 12.5 | 982 | 6 |
| 1* | No | 28.0 | | 930 | |
| 2 | Yes | 28.0 | 10.7 | 897 | 6.5 |
| 2* | No | 25.3 | | 842 | |
| 3 | Yes | 38.3 | 7.9 | 1276 | 9.9 |
| 3* | No | 35.5 | | 1161 | |

In the Annual Report on the Institute of Livestock Feeding and Nutrition Research, 1986, pp 44-45, by D. Visser the reported yield of milk from cows fed with intraruminally infused propionic acid at the rate of 9 mols/day are:

In the first week increased by 5.8 kg per day

In the 4th week increased by 1 kg per day

The author states in this Report that the production of milk fat and milk protein was not affected.

The above results show that the use of basic salts of propionic acid as feed supplements results in sustained increases in (i) milk yield of about 3.0-3.5 Kg and (ii) in milk protein of 6-9.9% per day throughout their lactation period in spite of using a relatively lower amount of the feed supplement in comparison with Visser's reported results.

I claim:

1. A ruminant animal feedstuff comprising a feed concentrate and an amount of a basic salt of propionic acid having a pH of 8-14 effective to improve milk production.

2. A feedstuff according to claim 1 wherein the salt contains cations selected from ammonium, Group I and Group II metal ions.

3. A feedstuff according to claim 1 wherein the salt is a basic propionate salt of ammonium, sodium, potassium, calcium or magnesium having a pH value of 8-12.

4. A feedstuff according to claim 1 wherein the basic propionate salt has an excess of hydroxyl ions.

5. A feedstuff according to claim 1 wherein the basic propionate salt is added to a feed concentrate in an amount from 0.5-50% w/w of the concentrate fed to the ruminant animal.

6. A feedstuff according to claim 1 wherein the basic propionate salt is present in an amount from 0.1-20% w/w of the total dry matter in the feed.

7. A method of preparing a basic propionate salt which comprises mixing sodium hydroxide with magnesium oxide and/or calcium oxide and then reacting the mixture so formed with less than molar equivalent of propionic acid.

8. A method of supplementing the diet of a ruminant animal which comprises orally administering to said animal an amount of a basic salt of propionic acid having a ph of 8-14 effective to improve milk production.

9. A method as defined in claim 8 wherein said salt is a basic salt of ammonium, potassium, calcium or magnesium having a pH value of 8-12.

10. A method as defined in claim 9 wherein the said salt has an excess of hydroxyl ions based on the cations available.

11. A method as defined in claim 8 wherein the said salt has an excess of hydroxyl ions based on the cations available.

* * * * *

UNITED STATES PATENT AND TRADEMARK OFFICE
CERTIFICATE OF CORRECTION

PATENT NO. : 4,959,223
DATED : September 25, 1990
INVENTOR(S) : JOHANNES A.C. VAN OOYEN It is certified that error appears in the above-identified patent and that said Letters Patent is hereby corrected as shown below:

Col. 2, l. 59, change "This" to --The--

Col. 3, l. 56, should read "of such a proce-"

Col. 5, l. 11, should read "The salt was added to the feed"

Col. 6, l. 24, insert a footnote to Table 2 --
*Control Test not according to the invention Claim 4, l. 2, after "ions" insert --based on the cations available.--.

Claim 7, l. 4, after "than" and before "molar" insert --a--.

Signed and Sealed this

Nineteenth Day of May, 1992

Attest:

DOUGLAS B. COMER

*Attesting Officer*   *Acting Commissioner of Patents and Trademarks*